March 20, 1951     W. A. E. HULT     2,546,071
APPARATUS TO PRODUCE FRESH WATER FROM OCEAN WATER
Filed Oct. 1, 1948
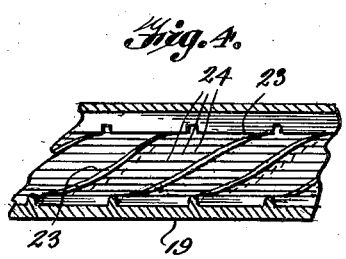
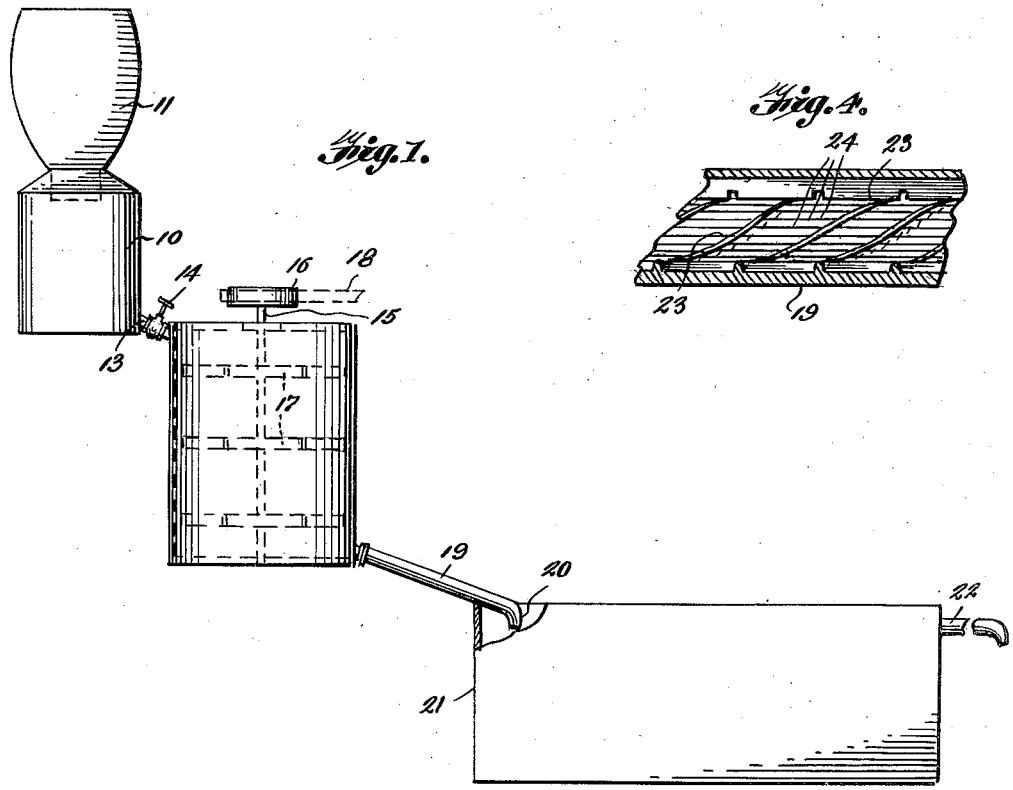
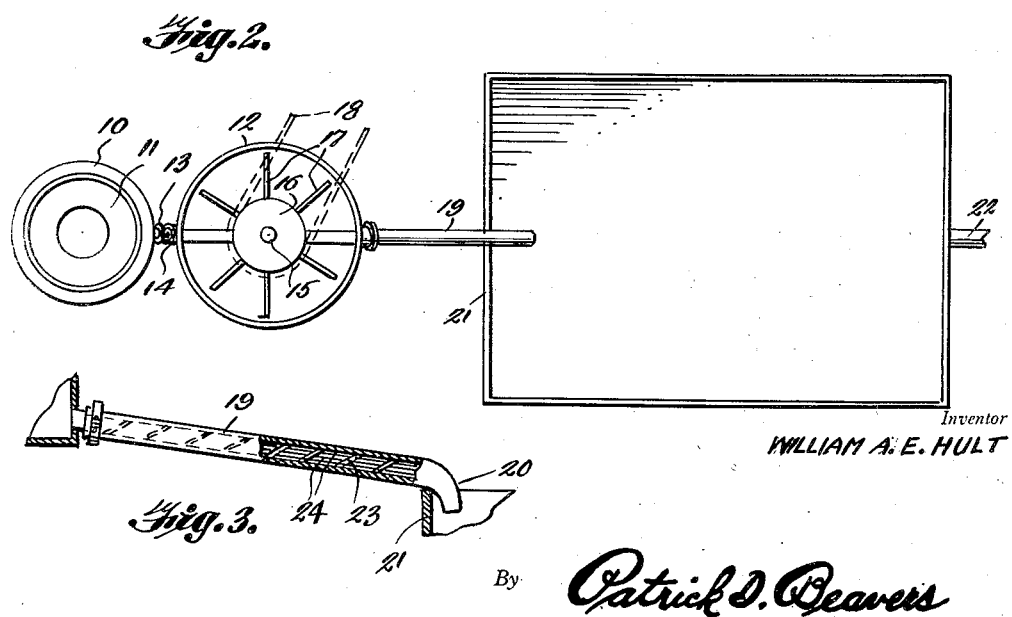
Inventor
WILLIAM A. E. HULT
By *Patrick D. Beavers*
Attorney Patented Mar. 20, 1951

2,546,071

UNITED STATES PATENT OFFICE 2,546,071

APPARATUS TO PRODUCE FRESH WATER FROM OCEAN WATER

William A. E. Hult, San Diego, Calif.

Application October 1, 1948, Serial No. 52,333

2 Claims. (Cl. 210—16)

The present invention relates to process for producing fresh water from ocean water.

It is an object of the present invention to provide a process whereby the composition of ocean water may be easily and cheaply changed to water fit for irrigation purposes or for the recovery of nitrates therefrom by evaporation.

A further object of the invention is the provision of a process of the character set forth which will provide a source of fresh water for use other than for household and drinking purposes during emergency water shortages.

Another object of the invention is the provision of a process of the character set forth which will provide a resultant water containing chemicals adapted to enrich soil when used to irrigate the same.

A further object of the invention is the provision of a process of the character set forth which, when used in conjunction with the conventional evaporation methods, may be used to produce commercial nitrates in solid form.

A further object of the invention is the provision of suitable apparatus for accomplishing the above-mentioned objects.

Other and further objects of the invention will become apparent from a reading of the following specification taken in conjunction with the drawing, in which:

Figure 1 is a side elevational view of one form of plant which may be utilized to carry out the invention, Figure 2 is a plan view of Figure 1, Figure 3 is a fragmentary elevational view, partly broken away, illustrating a sluice pipe utilized in carrying out the invention, and Figure 4 is a fragmentary sectional view illustrating certain details of the aforesaid sluice pipe.

Generally there is provided a process for changing the composition of sea water to water fit for irrigation purposes and, in fact, all domestic purposes with the exception of household and drinking purposes and which consists essentially in the regulated admixture of commercial silver nitrate with sea water in an agitator, passing the same through a "rifle barrel" type sluice pipe to recover therein the resultant precipitate of silver chloride, a settling tank for receiving the thus treated water now lacking in chlorine solutes but containing sodium nitrates and thence dispensing the resultant water, which has further precipitated its silver chloride in the settling tank to evaporation ponds for the extracting of commercial nitrates or immediate disposal as irrigation water. An important step in the process is the recovery of the precipitate silver chloride from the sluice pipe and the settling tank. This precipitate may be refined and, in large scale operations might be enhanced in value by the recovery therefrom of precious metals contained in sea water.

Referring more particularly to the drawing, there is shown therein a liquid dispenser 10 in the upper end of which is mounted an inverted carboy 11. The lower end of the dispenser is connected with the upper end of an agitator 12 by means of a pipe 13 having a valve 14 therein. The agitator has mounted therein a vertically extending shaft 15 provided with a pulley 16 and a plurality of agitator blades 17. The pulley is connected by means of a belt 18 to a suitable source of power.

The lower end of the agitator tank 12 is provided with a downwardly directed sluice pipe 19 terminating in a spout 20 which is located in the upper end of a settling tank 21. The tank 21 is provided with an overflow pipe 22.

The sluice pipe 19 is of the "rifle barrel" type in that it is provided with an inwardly directed spiral ridge 23 having a series of longitudinally extending corrugations 24 between each successive convolution of the ridge 23.

In carrying out the process of the present invention, a carboy 11 of silver nitrate is inverted and placed in the upper end of the dispenser 10 from which the same is dispensed in controlled amount by means of the valve 14 to the agitator tank 12 which is constantly supplied with sea water. This mixture is agitated and further admixed by the motion of the blades 17. The resultant mixture then passes by gravity through the sluice pipe 19 and silver chloride is precipitated upon the interior of the sluice pipe. The precipitation is greatly aided by the ridge 23 and the corrugations 24 which cause the mixture passing from the agitator tank to pass in a circuitous path along the interior thereof. The sluice pipe 19 may be removed from time to time for cleaning and for the recovery of the silver chloride which may thereafter be dried and refined. The liquid passing into the settling tank 21 will further precipitate silver chloride to the bottom of the settling tank and this precipitate may also be recovered from time to time. The resultant fresh water will pass from the overflow pipe 22 for direct disposal as irrigation water or may be directed to evaporation ponds for the extraction therefrom of commercial nitrates.

The chemical equation involved may be represented as follows:

$$AgNO_3 + NaCl = AgCl + NaNO_3$$

In addition to the above reaction with the added commercial silver nitrate there will be also the following reaction:

$$2AgNO_3 + MgCl_2 = 2AgCl + Mg(NO_3)_2$$

It will thus be seen that the two principal chlorides contained in sea water will be affected by the addition of silver nitrate to precipitate therefrom silver chloride which may be thereafter recovered and refined and that the resultant water will have an absence of chlorides and may be utilized wherever fresh water may be required with the exception of use for household and drinking purposes as aforesaid.

While but one form of the invention has been shown and described herein, it will be readily apparent to those skilled in the art that many minor modifications may be made without departing from the spirit of the invention or the scope of the appended claims.

What is claimed is:

1. In an apparatus for the production of fresh water from sea water including a dispenser for a nitrate adapted to chemically interchange its metal with the sodium of the sea water, a mechanical mixing tank, a valved pipe interconnecting the dispenser and the mixing tank, and a settling tank, of a rifle barrel sluice extending downwardly and at an angle from the mixing tank to the settling tank, said sluice having formed on its inner walls a continuous spiral ridge and a plurality of longitudinally extending corrugations between each of the successive convolutions of the ridge.

2. A sluice for assisting chemical precipitation comprising an elongated cylindrical body, a continuous spiral ridge formed on the inner wall of the body, and a plurality of longitudinally extending corrugations between each of the successive convolutions of said ridge.

WILLIAM A. E. HULT.

REFERENCES CITED

The following references are of record in the file of this patent:

UNITED STATES PATENTS

| Number | Name | Date |
|---|---|---|
| 807,807 | Broman | Dec. 19, 1905 |
| 1,265,898 | Figg | May 14, 1918 |
| 1,915,240 | Putnam | June 20, 1933 |
| 2,190,596 | Dorr | Feb. 13, 1940 |
| 2,252,045 | Spanner | Aug. 12, 1941 |
| 2,322,689 | Goetz | June 22, 1943 |